(12) United States Patent
Lan

(10) Patent No.: US 6,308,805 B1
(45) Date of Patent: Oct. 30, 2001

(54) STROLLER HAVING A BRAKE DEVICE

(76) Inventor: Red Lan, 15F, No. 108, Sec. 1, Hsin Tai 5th Rd., Hsichih, Taipei Hsien (TW)

( * ) Notice: Subject to any disclaimer, the term of this patent is extended or adjusted under 35 U.S.C. 154(b) by 0 days.

(21) Appl. No.: 09/598,132

(22) Filed: Jun. 21, 2000

(51) Int. Cl.$^7$ ..................................................... B62B 9/08
(52) U.S. Cl. ............................................. 188/20; 280/647
(58) Field of Search .................................. 280/647, 648, 280/649, 650; 188/20, 31, 6 F

(56) References Cited

U.S. PATENT DOCUMENTS

| | | | |
|---|---|---|---|
| 4,527,665 | * | 7/1985 | Shamie ................................... 188/20 |
| 5,460,399 | * | 10/1995 | Baechler et al. ..................... 280/650 |
| 5,765,665 | * | 6/1998 | Cheng et al. .......................... 188/20 |
| 6,102,167 | * | 8/2000 | Chiu ....................................... 188/20 |
| 6,170,615 | * | 1/2001 | Cheng ..................................... 188/20 |

* cited by examiner

Primary Examiner—Kevin Hurley
(74) Attorney, Agent, or Firm—Renner, Otto, Boisselle & Sklar, LLP

(57) ABSTRACT

A stroller with a brake device which has a mounting seat mounted between two upright rear rods of the stroller. An operating member has a slidable mounting portion mounted slidably on the mounting seat, an operating portion, and a downward extension which is connected to a transverse linking member that has two opposite ends connected to two brake members. The brake members are pivoted to the rear rods about a horizontal pivot axis. The operating member is operable for turning rearward to cause the slidable mounting portion and the transverse linking member to move rearward relative to the mounting seat so as to enable the brake members to pivot in a direction for moving to a braking position, where the brake members engage two rear wheels of the stroller to stop rotation of the same. The operating member is further operable for turning forward to cause the slidable mounting portion and the transverse linking member to move forwardly relative to the mounting seat so as to enable the brake members to pivot in an opposite direction for moving to a releasing position, where the brake members are disengaged from the rear wheels.

7 Claims, 5 Drawing Sheets

STROLLER HAVING A BRAKE DEVICE

BACKGROUND OF THE INVENTION

1. Field of the Invention

The invention relates to a stroller having a brake device which can be conveniently operated to stop rotation of two spaced-apart rear wheels thereof simultaneously so as to stop movement of the stroller.

2. Description of the Related Art

A conventional stroller is generally equipped with brake members mounted respectively on rear wheels thereof. The brake members are operated separately to stop rotation of the rear wheels, respectively. This may cause inconvenience during operation of the brake members. Moreover, this might result in overturning of the stroller when the stroller moves along a bumpy path or along a downward slope since the stroller cannot be stopped instantly.

A brake device that can be operated to simultaneously stop rotation of two rear wheels of a stroller has been suggested in the art. However, this type of brake device cannot be used with a stroller that is foldable by moving its lateral parts toward each other.

SUMMARY OF THE INVENTION

Therefore, the main object of the present invention is to provide a stroller having a brake device which is operable to stop rotation of two spaced-apart rear wheels of the stroller simultaneously so as to stop movement of the stroller.

Accordingly, the stroller of the present invention includes apair of upright rear rods, a connecting frame, and a brake device. The rear rods are opposite to each other in a first direction. Each of the rear rods has a lower end provided with a rear wheel. The connecting frame extends between and interconnects the rear rods. The brake device includes a mounting seat, an operating member, an elongate linking member and a pair of braking members. The mounting seat is mounted on the connecting frame between the rear rods, and has a lower end portion provided with a retaining rod that extends in the first direction. The operating member has a slidable mounting portion which has a rear end disposed rearwardly of the mounting seat, and a front end extending from the rear end through the mounting seat. The slidable mounting portion is formed with an elongate slot which extends from the rear end to the front end of the slidable mounting portion in a second direction transverse to the first direction and which has the retaining rod extending therethrough such that the slidable mounting portion is movable in the second direction relative to the mounting seat. An operating portion extends rearwardly from the rear end of the slidable mounting portion. A downward extension extends downwardly from the slidable mounting portion. The linking member extends in the first direction, and has opposite first and second ends and an intermediate portion that is mounted on the downward extension of the operating member. Each of the brake members has an upper end connected to a respective one of the first and second ends of the linking member, a lower end, and an intermediate portion pivoted to a respective one of the rear rods about a pivot axis along the first direction. The brake members are pivotable about the pivot axis in a third direction for moving to a braking position, in which the lower ends of the brake members engage the rear wheels, respectively, to stop rotation of the rear wheels. The brake members are further pivotable about the pivot axis in a fourth direction opposite to the third direction for moving to a releasing position, in which the brake members are disengaged from the rear wheels to permit rotation of the rear wheels. The operating portion of the operating member is operable for turning rearward so as to cause the slidable mounting portion to slide rearwardly and to cause the downward extension and the linking member to move rearwardly relative to the mounting seat so as to enable the brake members to pivot about the pivot axis in the third direction for moving to the braking position. The operating portion of the operating member is further operable for turning forward so as to cause the slidable mounting portion to slide forwardly and to cause the downward extension and the linking member to move forwardly relative to the mounting seat so as to enable the brake members to pivot about the pivot axis in the fourth direction for moving to the releasing direction.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
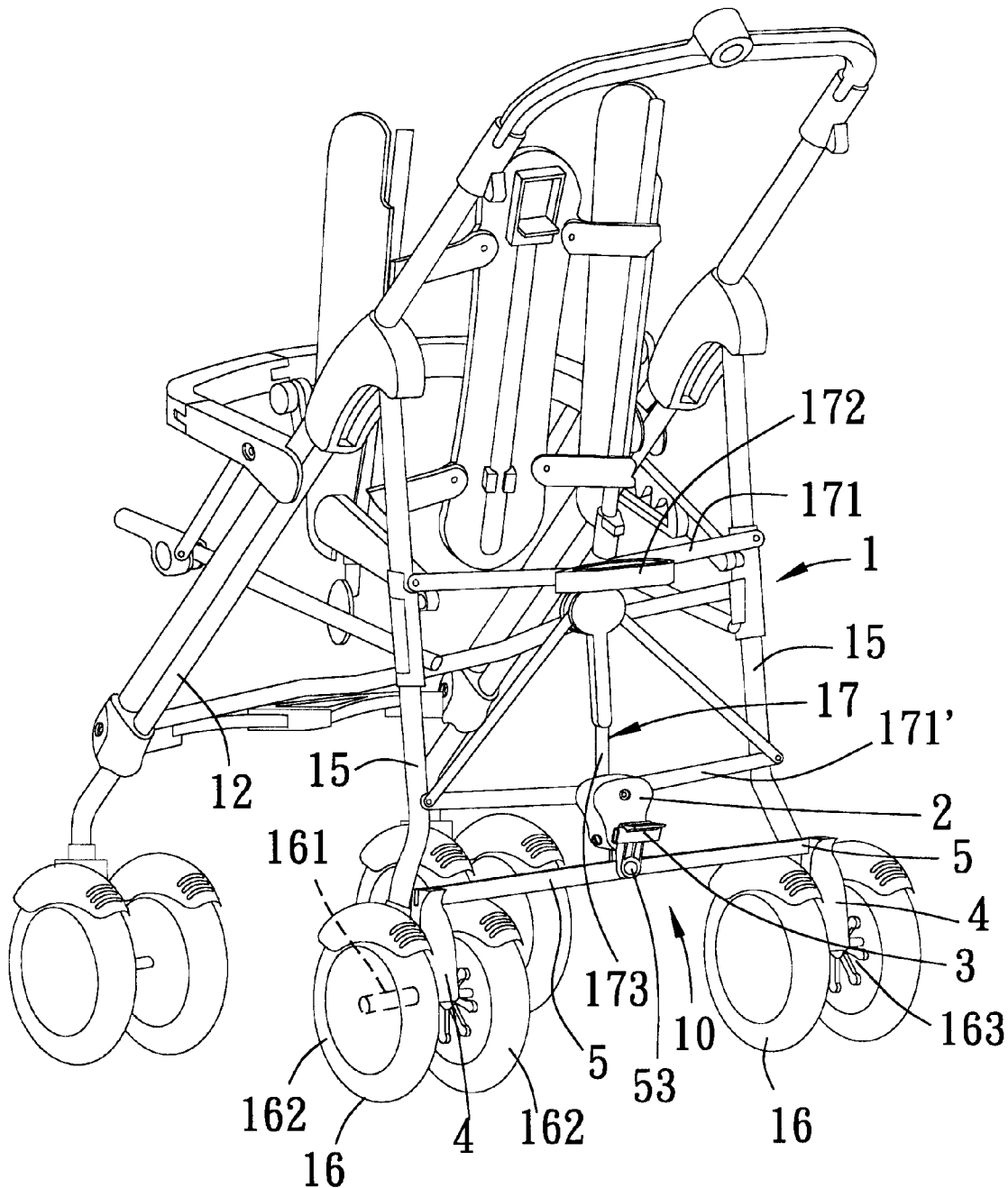
FIG. 1 is a rear perspective view of a preferred embodiment of the stroller of the present invention.
Figure 2:
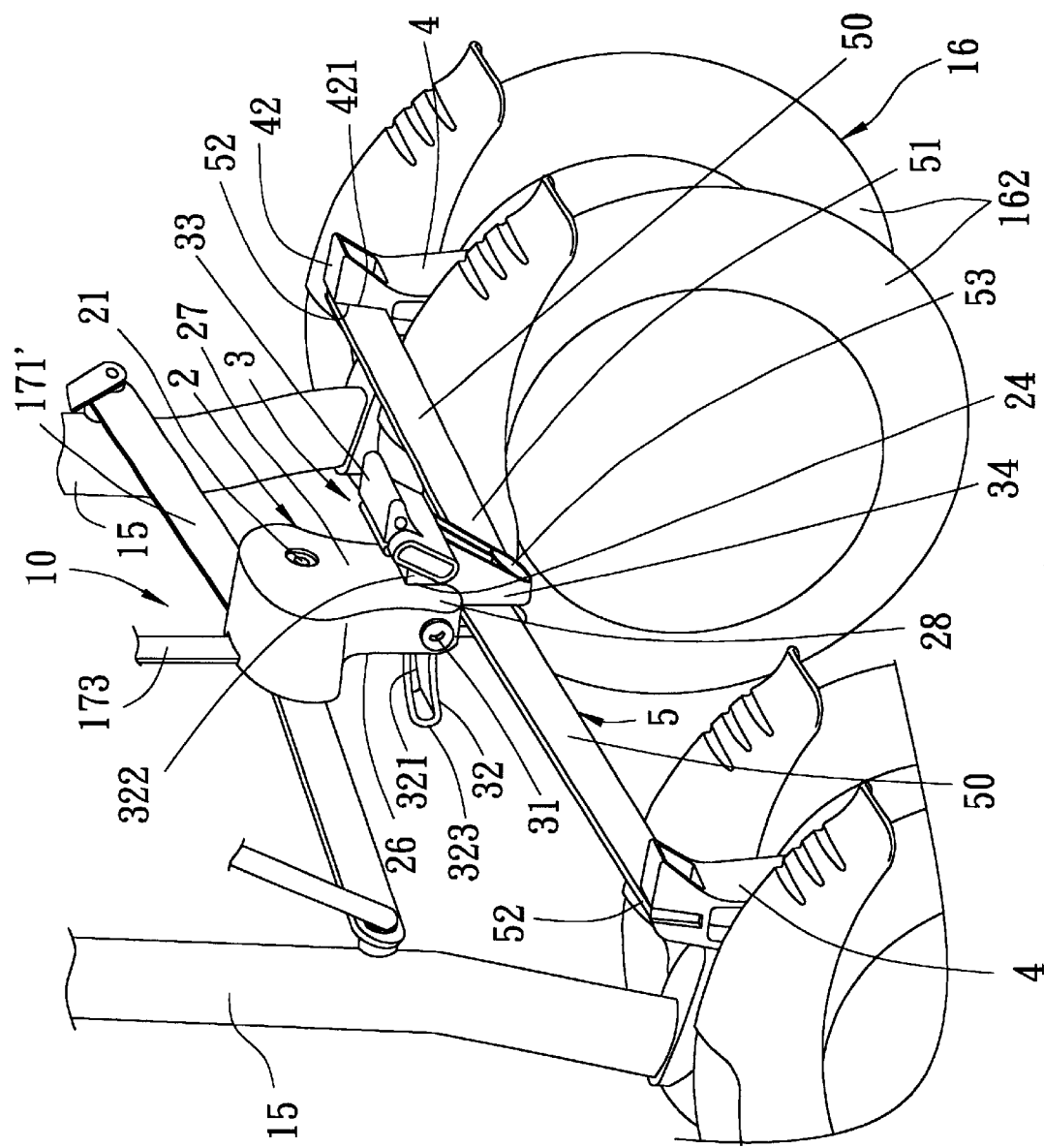
FIG. 2 is a fragmentary rear perspective view showing a brake device of the stroller of the preferred embodiment.

Referring to FIGS. 1 and 2, the preferred embodiment of the stroller of the present invention is shown to includes a stroller frame 1 with a pair of upright rear rods 15, a connecting frame 17 extending between and interconnecting foldably the rear rods 15, and a brake device 10.

The rear rods 15 are disposed at two lateral sides of the stroller frame 1, and are opposite to each other in a horizontal first direction. Each of the rear rods has a lower end provided with a rear wheel 16 which includes a pair of wheel bodies 162 and a wheel axle 161 interconnecting co-rotatably the wheel bodies 162. The wheel bodies 162 of each of the rear wheels 16 have confronting inner sides, each of which is formed with a series of engaging grooves 163 that are displaced from one another in a circumferential direction.

The connecting frame 17 includes a connecting seat 172 disposed between the rear rods 15, a pair of upper connecting bars 171, a pair of lower connecting bars 171', and a vertical central connecting bar 173. Each of the upper connecting bars 171 extends between the connecting seat 172 and a respective one of the rear rods 15, and is connected pivotally to the connecting seat 172 and the respective one of the rear rods 15. Each of the lower connecting bars 171' extends between the central connecting bar 173 and a respective one of the rear rods 15, and is connected pivotally to a lower end of the central connecting bar 173 and the respective one of the rear rods 15. The connecting frame 17 is operable by lifting the connecting seat 172 to cause pivoting movement of the upper and lower connecting bars 171, 171' so as to permit movement of the rear rods 15 in the first direction toward each other for folding the stroller frame 1.

Figure 4:
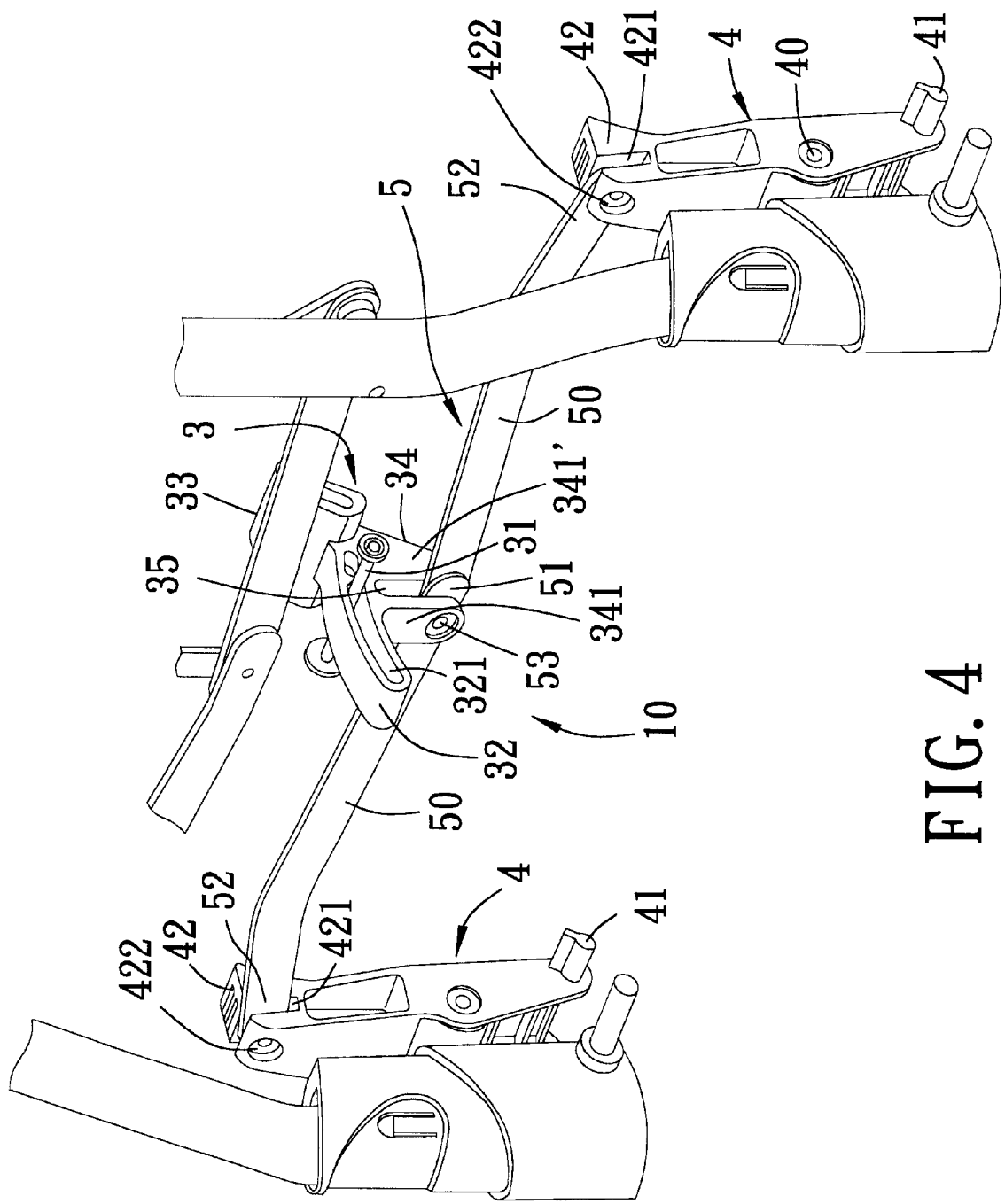
FIG. 4 is a fragmentary front perspective view showing the brake device of the preferred embodiment, where a mounting seat and a pair of rear wheels are omitted for the sake of clarity.

Referring to FIGS. 2 and 4, the brake device 10 includes a mounting seat 2, an operating member 3, an elongate linking member 5, and a pair of brake members 4. The mounting seat 2 is mounted at the lower end of the central connecting bar 173 by means of a pivot shaft 21 which extends through the lower end of the connecting bar 173 and the corresponding ends of the pair of lower connecting bars 171' for connecting pivotally the lower connecting bars 171' to the central connecting bar 173 and the mounting seat 2. The mounting seat 2 has a front wall 26, a rear wall 27 opposite to the front wall 26, and a lower end portion 28 which is formed with a slide passage 24 that opens downwardly and that extends in a horizontal second direction transverse to the first direction through the front and rear walls 26, 27. The lower end portion 28 is provided with a retaining rod 31 which extends in the first direction across the slide passage 24.

The operating member 3 has a slidable mounting portion 32 which has a rear end 322 disposed rearwardly of the mounting seat 2 and a front end 323 that extends forwardly from the rear end 322 through the slide passage 24 of the mounting seat 2. The slidable mounting portion 32 is formed with an elongate slot 321 which extends from the rear end 322 to the front end 323 in the second direction and which has front and rear slot portions that are opposite to each other in the second direction. The elongate slot 321 is open at lateral sides of the slidable mounting portion 32, and has the retaining rod 31 extending therethrough such that the slidable mounting portion 32 is movable in the second direction relative to the mounting seat 2. An operating portion 33 extends rearwardly and upwardly from the rear end 322 of the slidable mounting portion 32, and is formed as a pedal adapted for stepping. A downward extension 34 extends downwardly from the slidable mounting portion 32, and includes spaced front and rear pivot plates 341, 341' which define a downwardly opening mounting groove 35 therebetween.

Each of the brake members 4 has an upper end 42 formed with a slit 421 that extends in the first direction and that is aligned with the mounting groove 35 in the downward extension 34 of the operating member 3, a lower end disposed between the wheel bodies 162 of a respective one of the rear wheels 16, and an intermediate portion mounted pivotally on a respective one of the rear rods 15 about a first pivot axle 40 that extends along the first direction. The lower end of each of the brake members 4 is formed with two stop projections 41 disposed on two lateral sides thereof for engaging an aligned pair of the engaging grooves 163(see FIG. 3) in the respective one of the rear wheels 16.

The elongate linking member 5 extends in the first direction, and includes first and second linking rods 50, each of which has an outer end 52 extending into the slit 421 in the upper end 42 of a respective one of the brake members 4, and an inner end 51 extending into the mounting groove 35 in the downward extension 34. The outer end 52 of each of the linking rods 50 is connected pivotally to the upper end 42 of the respective brake member 4 by means of a second pivot axle 422 that extends in the second direction. A third pivot axle 53 extends in the second direction through the inner ends 51 of the linking rods 50 and the front and rear pivot plates 341, 341' for connecting pivotally the inner ends 51 of the linking rods 50 to the downward extension 34 of the operating member 3.

Figure 3:
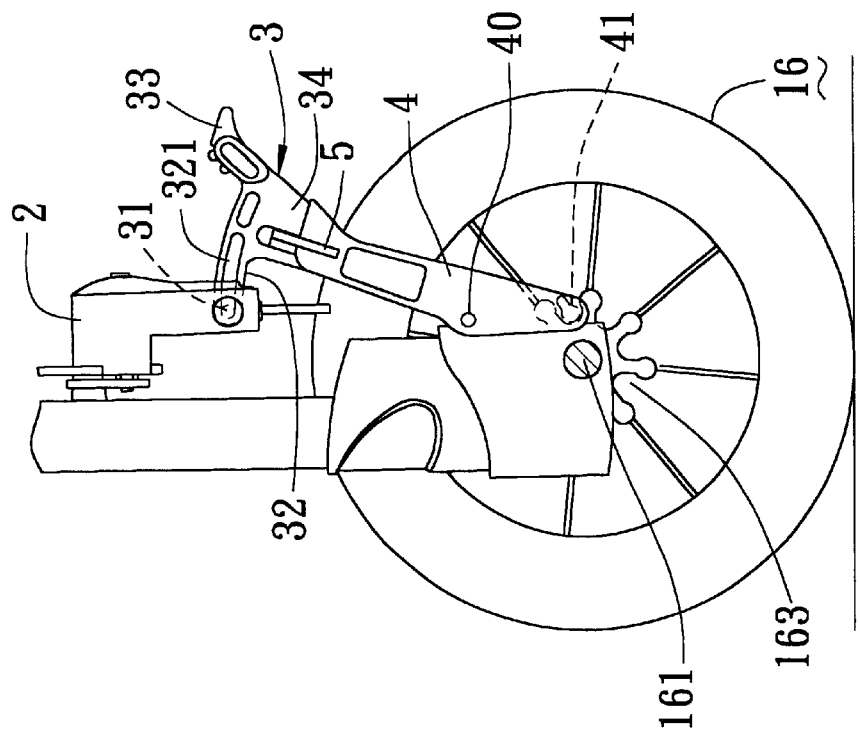
FIG. 3 is a fragmentary side view illustrating the brake device in a releasing state.
Figure 5:
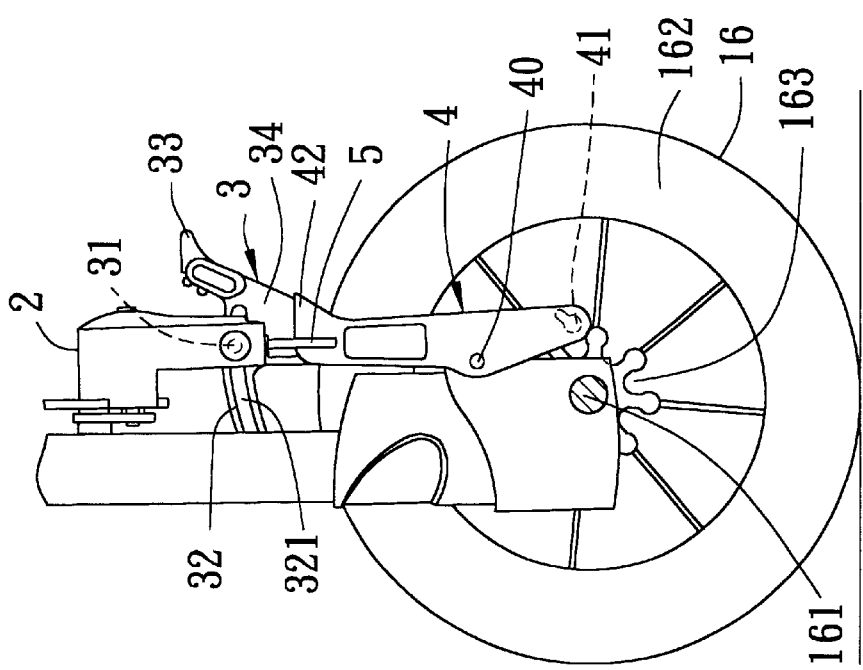
FIG. 5 is a fragmentary side view illustrating the brake device in a braking state.

Referring to FIGS. 3 and 5, before the operating member 3 is operated, the retaining rod 31 is disposed in the rear slot portion of the elongate slot 321, and the brake members 4 are disposed in a releasing position, as shown in FIG. 3, in which the stop projections 41 of the brake members 4 do not engage the engaging grooves 163 in the rear wheels 16 to permit rotation of the rear wheels 16 about the wheel axles 161 for movement of the stroller 1.

When the operating member 3 is operated by a person stepping on the operating portion 33 to turn the operating portion 33 rearward, as shown in FIG. 5, the slidable mounting portion 32 is pulled to slide rearwardly relative to the mounting seat 2 such that the retaining rod 31 is disposed in the front slot portion of the elongate slot 321. The downward extension 34 and the linking member 5 are moved rearwardly relative to the mounting seat 2 so as to enable the brake members 4 to pivot about the first pivot axles 40 in a third direction for moving to a braking position, in which the stop projections 41 of the brake members 40 engage the engaging grooves 163 in the rear wheels 16.

To release the rear wheels 16 from the braking state, the operating portion 33 is operated once again for turning forward so as to cause the slidable mounting portion 32 to slide forwardly to dispose the retaining rod 31 in the rear slot portion of the elongate slot 321. The downward extension 34 and the linking member 5 are thus moved forwardly relative to the mounting seat 2 to enable the brake members 4 to pivot about the pivot axles 40 in a fourth direction opposite to the third direction for disengaging the stop projections 41 of the brake members 4 from the engaging grooves 163 in the rear wheels 16.

Figure 6:
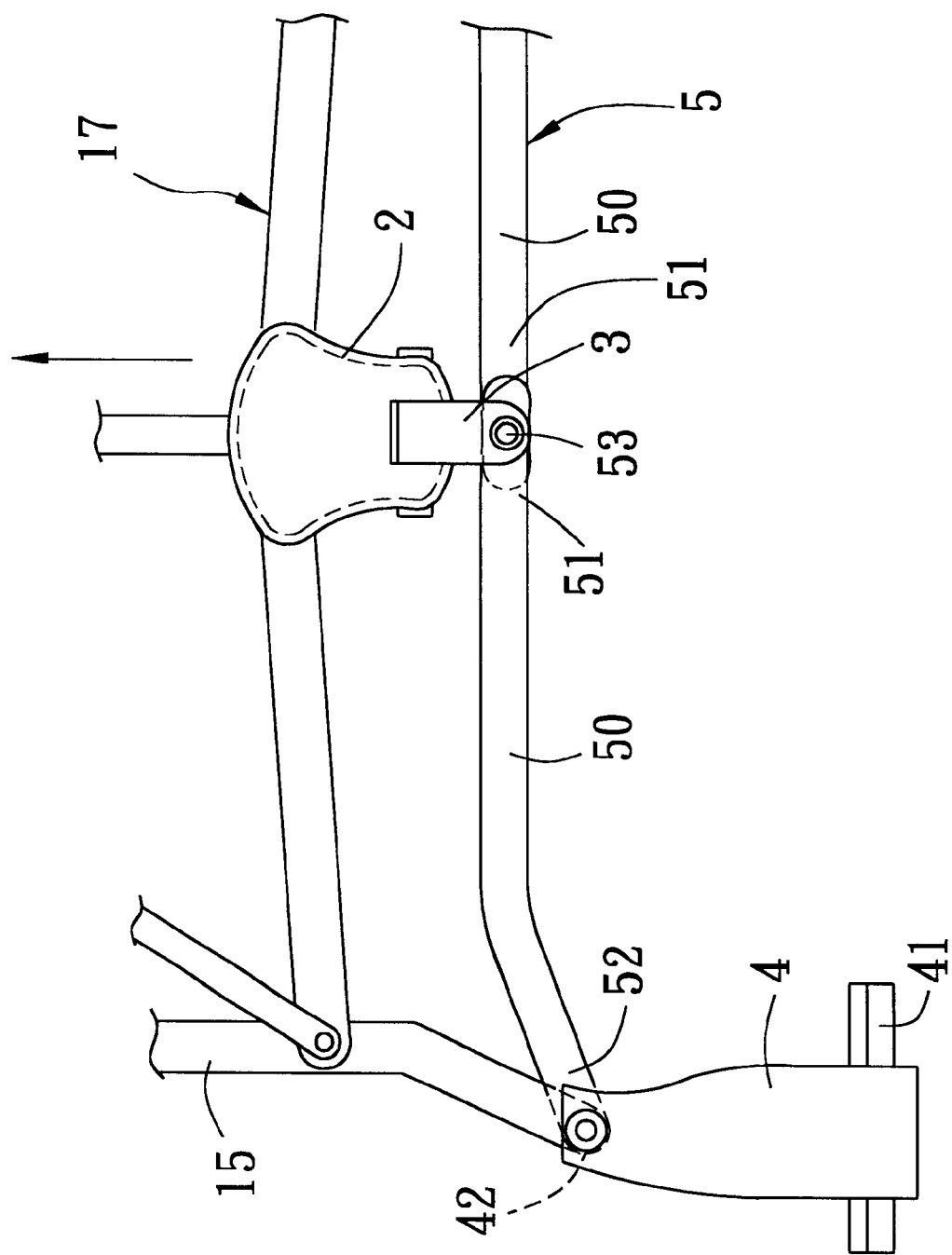
FIG. 6 is a schematic rear view showing the brake device of the preferred embodiment.

Referring to FIG. 6, since the linking member 5 includes two linking rods 50 which are connected pivotally to the operating member 3 at the inner ends 51 thereof and are connected pivotally to the brake members 4 at the outer ends 52 thereof, when the connecting frame 17 is operated by lifting the connecting seat 172 (see FIG. 1) upwardly to move the rear rods 15 close to each other for folding the stroller, the mounting seat 2 and the operating member 3 are moved upwardly correspondingly to permit folding of the linking rods 50 toward each other.

It has been shown that, the brake device 10 of the stroller of the present invention can be conveniently operated to stop rotation of the two rear wheels 16 simultaneously by means of the operating portion 33. It is not necessary to operate separately two brake members so as to stop rotation of two rear wheels, respectively, as in the prior art. In addition, as illustrated in the preferred embodiment, the brake device 10 can be used with the type of stroller that is foldable by moving its lateral parts close to each other.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A stroller comprising:
   a pair of upright rear rods which are opposite to each other in a first direction, each of said rear rods having a lower end provided with a rear wheel;
   a connecting frame extending between and interconnecting said rear rods; and
   a brake device including
      a mounting seat mounted on said connecting frame between said rear rods, said mounting seat having a lower end portion provided with a retaining rod that extends in the first direction, an operating member having a slidable mounting portion which has a rear end disposed rearwardly of said mounting seat and a front end extending from said rear end through said mounting seat, said slidable mounting portion being formed with an elongate slot which extends from said rear end to said front end of said slidable mounting portion in a second direction transverse to the first direction and which has said retaining rod extending therethrough such that said slidable mounting portion is movable in the second direction relative to said mounting seat, an operating portion extending rearwardly from said rear end of said slidable mounting portion, and a downward extension that extends downwardly from said slidable mounting portion, an elongate linking member extending in the first direction and having opposite first and second ends and an intermediate portion that is mounted on said downward extension of said operating member, and a pair of brake members, each of which has an upper end connected to a respective one of said first and second ends of said linking member, a lower end, and an intermediate portion pivoted to a respective one of said rear rods about a first pivot axis along the first direction, said brake members being pivotable about the first pivot axis in a third direction for moving to a braking position, in which said lower ends of said brake members engage said rear wheels, respectively, to stop rotation of said rear wheels, said brake members being further pivotable about the first pivot axis in a fourth direction opposite to the third direction for moving to a releasing position, in which said brake members are disengaged from said rear wheels to permit rotation of said rear wheels, said operating portion of said operating member being operable for turning rearward so as to cause said slidable mounting portion to slide rearwardly and to cause said downward extension and said linking members to move rearwardly relative to said mounting seat so as to enable said brake members to pivot about said first pivot axis in the third direction for moving to the braking position, said operating portion of said operating member being further operable for turning forward so as to cause said slidable mounting portion to slide forwardly and to cause said downward extension and said linking members to move forwardly relative to said mounting seat so as to enable said brake members to pivot about said first pivot axis in the fourth direction for moving to the releasing direction.

2. The stroller according to claim 1, wherein said mounting seat has opposite front and rear walls, and is formed with a slide passage which extends in the second direction through said front and rear walls, said slidable mounting portion of said operating member extending through said slide passage and being slidable along said slide passage.

3. The stroller according to claim 1, wherein said elongate slot in said slidable mounting portion of said operating member has a front slot portion and a rear slot portion which is opposite to the front slot portion in the second direction, said retaining rod being disposed in said rear slot portion when said operating member is turned forwardly for moving said brake members to the releasing position, said retaining rod being disposed in the said front slot portion when said operating member is turned rearwardly for moving said brake members to the braking position.

4. The stroller according to claim 1, wherein each of said rear wheels is formed with a series of engaging grooves which are displaced from one another in a circumferential direction, said lower end of each of said brake members being formed with a stop projection which engages one of said engaging grooves when said brake member moves to the braking position.

5. The stroller according to claim 1, wherein said linking member includes a first linking rod having an outer end which serves as said first end of said linking member and an inner end connected to said downward extension, and a second linking rod having an outer end which serves as said second end of said linking member and an inner end connected to said downward extension.

6. The stroller according to claim 5, wherein said outer end of each of said first and second linking rods is connected pivotally to a respective one of said brake members about a horizontal second pivot axis transverse to the first direction, said inner end of each of said first and second linking rods being connected pivotally to said downward extension of said operating member about a third pivot axis parallel to the second pivot axis.

7. The stroller according to claim 6, wherein said connecting frame includes a pair of connecting bars, each of which has an outer first end connected pivotally to a respective one of said rear rods, and an inner second end connected pivotally to said mounting seat of said brake device.

* * * * *